(12) United States Patent
Lim et al.

(10) Patent No.: US 10,030,881 B2
(45) Date of Patent: Jul. 24, 2018

(54) METHOD AND DEVICE FOR OPERATING AIR CONDITIONER

(71) Applicant: Samsung Electronics Co., Ltd., Suwon-si, Gyeonggi-do (KR)

(72) Inventors: Hunjung Lim, Suwon-si (KR); Hyejung Cho, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 15/111,323

(22) PCT Filed: Jan. 30, 2015

(86) PCT No.: PCT/KR2015/001027
§ 371 (c)(1),
(2) Date: Jul. 13, 2016

(87) PCT Pub. No.: WO2015/130019
PCT Pub. Date: Sep. 3, 2015

(65) Prior Publication Data
US 2016/0348931 A1    Dec. 1, 2016

(30) Foreign Application Priority Data
Feb. 25, 2014    (KR) .......................... 10-2014-0021901

(51) Int. Cl.
*F24F 11/00* (2018.01)
*F24F 11/30* (2018.01)
(Continued)

(52) U.S. Cl.
CPC ............ *F24F 11/006* (2013.01); *F24F 11/30* (2018.01); *F24F 11/62* (2018.01); *F24F 11/56* (2018.01);
(Continued)

(58) Field of Classification Search
CPC .... F24F 11/006; F24F 11/001; F24F 11/0034; F24F 2011/0026; F24F 2011/0064; F24F 2011/0068; F24F 2011/0073; Y02B 30/78
(Continued)

(56) References Cited

U.S. PATENT DOCUMENTS 5,156,203 A * 10/1992 Funakoshi ........... F24F 11/0009
165/207
5,745,381 A *  4/1998 Tanaka ................... G06Q 30/02
700/90
(Continued)

FOREIGN PATENT DOCUMENTS

| JP | 08-061741 A | 3/1996 |
| JP | 11-014119 A | 1/1999 |
| JP | 2011-007358 A | 1/2011 |
| JP | 2011-112322 A | 6/2011 |
| KR | 10-0674132 B1 | 1/2007 |
| KR | 10-1233208 B1 | 2/2013 |

*Primary Examiner* — Justin Jonaitis
(74) *Attorney, Agent, or Firm* — Jefferson IP Law, LLP

(57) ABSTRACT

An air conditioner, according to one embodiment of the present invention, comprises: a communication unit for receiving, from a terminal staying in a zone, first information of the terminal, including information on a previous staying time of the terminal in the zone; and a control unit for determining second information of the terminal, which contains an expected leaving time of the terminal, on the basis of the first information of the terminal and determining an operating mode and an operating time of the air conditioner on the basis of the second information of the terminal, and thus energy can be saved while minimizing a decline in the sensation of comfort felt by an occupant.

20 Claims, 9 Drawing Sheets

(51) Int. Cl.
| | |
|---|---|
| *F24F 11/62* | (2018.01) |
| *F24F 110/00* | (2018.01) |
| *F24F 110/70* | (2018.01) |
| *F24F 120/10* | (2018.01) |
| *F24F 11/65* | (2018.01) |
| *F24F 11/56* | (2018.01) |
| *F24F 11/61* | (2018.01) |

(52) U.S. Cl.
CPC .............. *F24F 11/61* (2018.01); *F24F 11/65* (2018.01); *F24F 2110/00* (2018.01); *F24F 2110/70* (2018.01); *F24F 2120/10* (2018.01); *Y02B 30/78* (2013.01)

(58) Field of Classification Search
USPC ........................................................ 165/237
See application file for complete search history.

(56) References Cited

U.S. PATENT DOCUMENTS

| | | | | |
|---|---|---|---|---|
| 6,721,706 | B1* | 4/2004 | Strubbe | G10L 15/18 704/257 |
| 2003/0193404 | A1* | 10/2003 | Joao | B60R 25/102 340/12.22 |
| 2008/0048826 | A1* | 2/2008 | Agrawal | G06F 19/327 340/5.61 |
| 2012/0072030 | A1* | 3/2012 | Elliott | F24F 11/0009 700/276 |
| 2013/0103207 | A1* | 4/2013 | Ruff | G05D 23/1902 700/278 |
| 2015/0370927 | A1* | 12/2015 | Flaherty | F24F 11/0076 703/1 |
| 2017/0159953 | A1* | 6/2017 | Kim | F24F 11/006 |

* cited by examiner

METHOD AND DEVICE FOR OPERATING AIR CONDITIONER

TECHNICAL FIELD

The present invention relates to a method and device for operating an air conditioner, and more particularly, to a method of operating an air conditioner and the air conditioner based on an action pattern of a person located within a specific zone.

BACKGROUND ART

In order to guarantee comfort of persons located within a closed zone (e.g., a lounge, conference room, or restaurant within a building), an air conditioner is used. The air conditioner is an equipment that enables persons to feel comfort and may be used as the same meaning as that of an air conditioning system. Two comforts such as thermal sensation and air quality may be provided by the air conditioner. Thermal sensation may be affected by weather and a peripheral environment. The air quality may be affected by a density or the number of persons (hereinafter, "occupants") located within a corresponding zone, and in order to adjust the air quality, an Energy Recovery Ventilator (ERV) may be used. In this specification and claims, an "air conditioner" may perform a function of an ERV.

DESCRIPTION OF THE INVENTION

Technical Problem

In order to guarantee comfort of occupants, the ERV may control a density of carbon dioxide ($CO_2$). In order to control a carbon dioxide density, the ERV may measure a carbon dioxide density of a specific zone using a sensor. Conventionally, a method of starting or stopping a dioxide density control operation according to whether the measured carbon dioxide density is equal to or greater than a predetermined value (e.g., 600 ppm or 800 ppm) has been used. The carbon dioxide density control operation is divided into at least two modes, and a method of enabling the ERV to operate in any one mode of the modes according to the measured carbon dioxide density has been used.

When a time in which an occupant enters a corresponding zone has regularity, in order to save energy, it is required to perform an adaptive carbon dioxide density control rather than the fixed method.

Solution to Problem

In accordance with an aspect of the present invention, a method of operating an air conditioner includes: determining second information of a terminal staying in a zone including an expected leaving time of the terminal based on first information of a terminal including information about a time in which the terminal has previously stayed in the zone; and determining an operation mode and operation time of the air conditioner based on the second information of the terminal.

In accordance with another aspect of the present invention, an air conditioner air conditioner includes: a communication unit that receives first information of a terminal including information about a time in which the terminal has previously stayed in a zone from the terminal staying in the zone; and a controller that determines second information of the terminal including an expected leaving time of the terminal based on the first information of the terminal and that determines an operation mode and operation time of the air conditioner based on the second information of the terminal.

Advantageous Effects of Invention

After previously studying a time in which an occupant of a specific zone has previously stayed, by operating an air conditioner based on action estimation of the occupant, while minimizing decline of comfort in which the occupant feels, energy can be saved. Further, by previously determining a condition that operates the air conditioner based on action estimation, decline of comfort in which the occupant feels can be minimized. Further, separately from determination of an operation mode of the air conditioner, by dynamically adjusting an operation time of a determined operation mode, an influence according to uncertainty of stay situation estimation of the occupant can be minimized.

MODE FOR THE INVENTION

Figure 1:
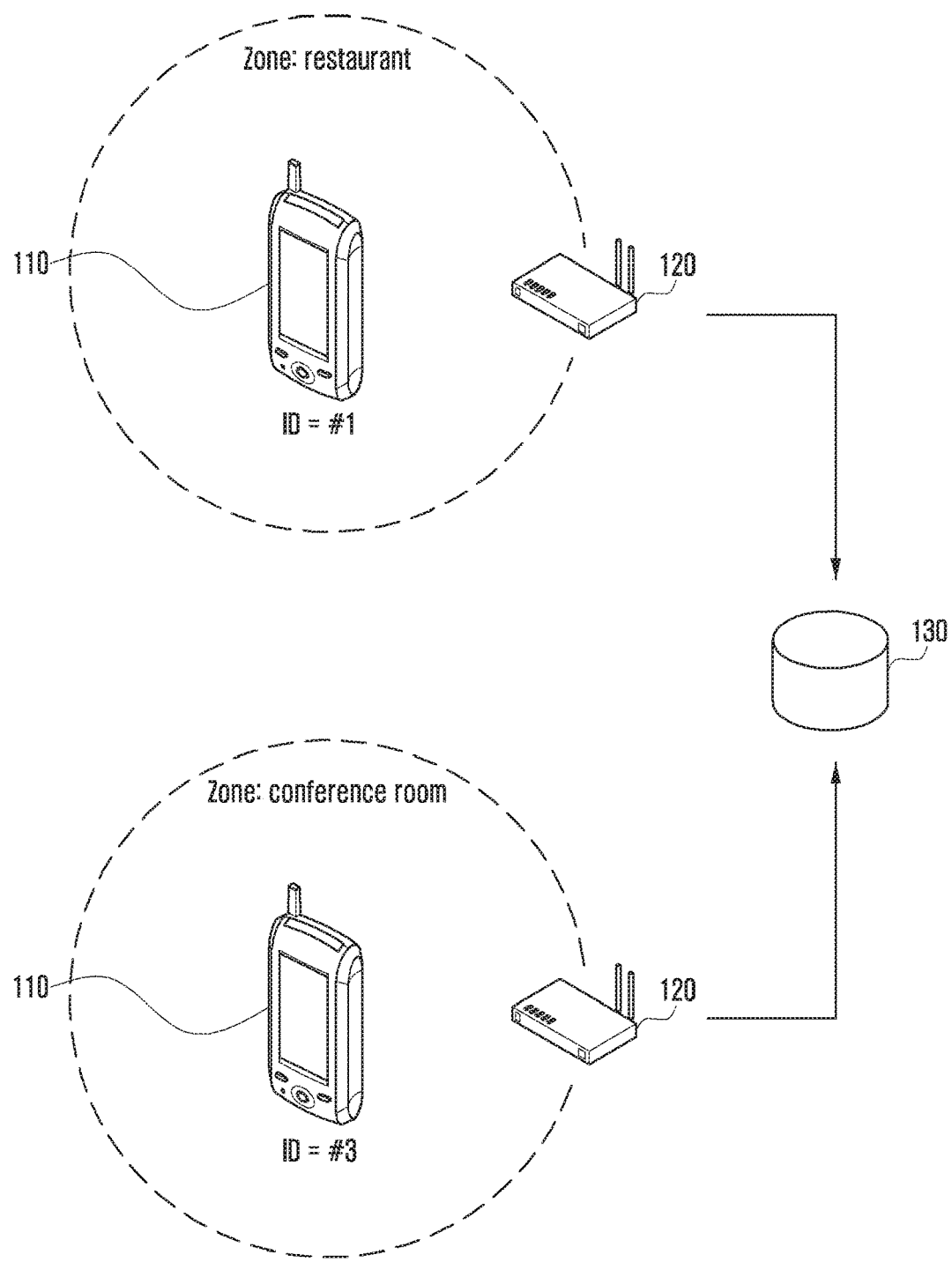
FIG. 1 is a diagram illustrating a configuration of a system including an air conditioner.

In this specification and claims, the word "comprising" does not imply the exclusion of other elements or operations. In this specification and claims, unless stated otherwise, a single noun may include a plurality of nouns. For example, a "terminal" may indicate one terminal or may include at least two terminals. Further, a "zone" may indicate one zone and may include at least two zones. In this specification and claims, a suffix "unit" of constituent elements is given and used to facilitate a description of a specification and does not have a distinguishing meaning or function. In this specification and claims, a "first, second, and third" are used for distinguishing similar elements, but are not always used for describing sequentially or in period order.

In this specification and claims, a "zone" is a region managed by a wireless AP or an air conditioner. According to an exemplary embodiment of the present invention, an area within an effective communication distance of a wireless AP may be defined to a region. According to another exemplary embodiment of the present invention, an area managed by an air conditioner may be defined to a region.

In this specification and claims, a zone may include a restaurant, conference room, or lounge.

In this specification and claims, a "first mode" or a "second mode" is one of operation modes of an air conditioner. Each operation mode may be divided by a power consumption amount or a fan velocity. In this specification and claims, for convenience, it is assumed that a power consumption amount or a fan velocity of a first mode is smaller than that of a second mode. In this specification and claims, two operation modes are described, but at least three operation modes may be implemented.

Hereinafter, various exemplary embodiments of the present invention will be described in detail with reference to the accompanying drawings. In the following description, only a portion necessary for understanding operation according to an exemplary embodiment of the present invention is described and a description of other portions may be omitted to avoid obscuring the subject matter of the present invention. Here, it should be understood that features of the present invention are not limited to the above-described illustrations and may include a form change or additional functions of each element described herein. In the drawings, a size of some elements may be enlarged for illustration, and elements are not shown in proportional to a size thereof.

FIG. 1 is a diagram illustrating a configuration of a system including an air conditioner.

Referring to FIG. 1, the system may include a terminal 110, wireless Access Point (AP) 120, and air conditioner 130.

The terminal 110 is an electronic device that can communicate with another terminal or a server. The terminal 110 may be a device in which an occupant always carries. The terminal 110 may include, for example, a tablet, Personal Computer (PC), Portable Multimedia Player (PMP), Personal Digital Assistant (PDA), smart phone, mobile phone, digital frame, and wearable device. The wearable device is an electronic device in which a human may wear and may have a form of, for example glasses, watch, bracelet, clothing, sports device, and medical device. The wearable device may be attached to a skin or may be implanted into a human body. When it is assumed that each occupant carries only a terminal, in the present invention, an occupant and a terminal may be used as the same meaning. The terminal 110 may transmit a signal to the air conditioner 130 through short range wireless communication. The signal transmission may be direct communication with the air conditioner 130 or may be communication through the wireless AP 120.

The wireless AP 120 may perform short range wireless communication with the terminal 110 or the air conditioner 130 existing within an effective communication distance. According to an exemplary embodiment of the present invention, the wireless AP 120 may register ID of an entered terminal 110, an entering time, and a leaving time based on a signal receiving from the terminal 110 entered into a management area thereof. The wireless AP 120 may transmit the registered information to the air conditioner 130.

The air conditioner 130 may receive and store a signal from the terminal 110 or the wireless AP 120. According to an exemplary embodiment of the present invention, the air conditioner 130 may register ID of an entered terminal 110, an entering time, and a leaving time based on a signal receiving from the terminal 110 entered into a management area thereof. According to an exemplary embodiment of the present invention, the air conditioner 130 may generate a tracking table using a signal received from the terminal 110 or the wireless AP 120. For example, the air conditioner 130 may calculate and register an expected staying time of each terminal 110 and the count in which each terminal 110 has stayed through information directly collected from the terminal 110 or information collected through the wireless AP 120.

In FIG. 1, the terminal 110 and the wireless AP 120 each are two, but the number of the terminal 110 and the wireless AP 120 is not limited thereto. The wireless AP 120 that can communicate with the air conditioner 130 may not exist or the wireless AP 120 that can communicate with the air conditioner 130 may be 1 or 3 or more. The number of the terminal 110 that can communicate with each wireless AP 120 is not limited.

Figure 2:
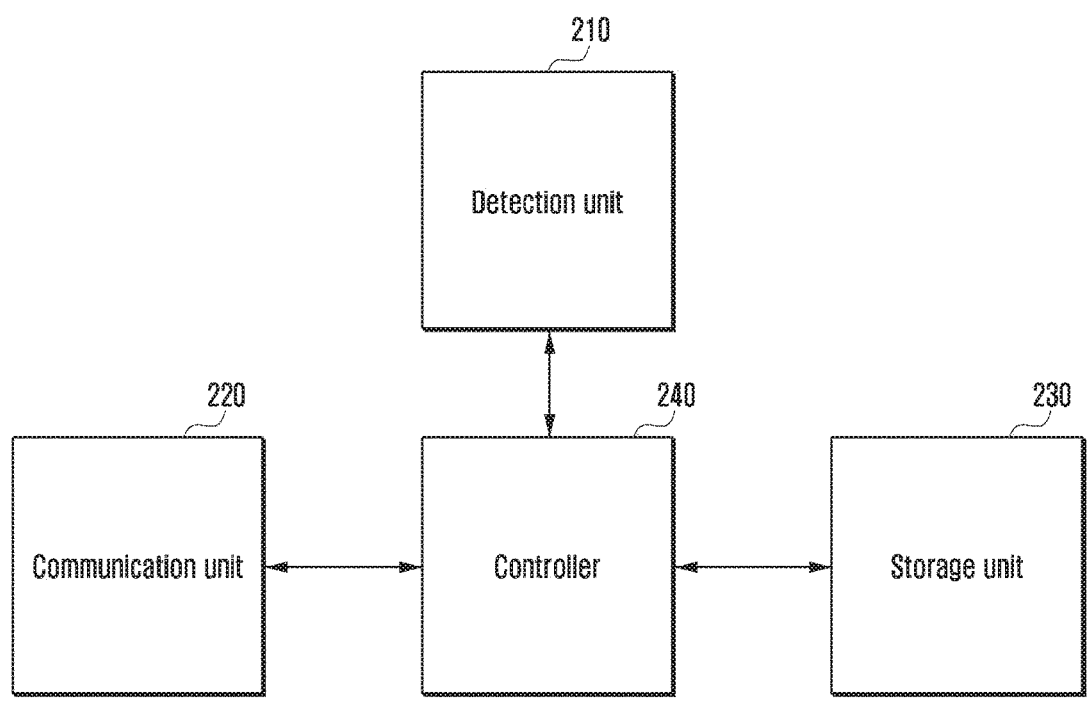
FIG. 2 is a block diagram illustrating a configuration of an air conditioner.

FIG. 2 is a diagram illustrating a configuration of an air conditioner according to an exemplary embodiment of the present invention.

Referring to FIG. 2, the air conditioner 130 of the present exemplary embodiment may include a detection unit 210, communication unit 220, storage unit 230, and controller 240.

The detection unit 210 may include a sensor for measuring a carbon dioxide density. According to an exemplary embodiment of the present invention, the detection unit 210 may periodically detect a carbon dioxide density of a predetermined zone. The zone may be the entire or a portion of areas managed by the air conditioner 130.

The communication unit 220 may transmit and receive a signal to and from the terminal 110 or the wireless AP 120. According to an exemplary embodiment of the present invention, the communication unit 220 may receive first information of the terminal 110 including information about a time in which the terminal 110 staying in a predetermined zone has previously stayed in the zone through the wireless AP 120. First information of the terminal 110 may further include ID of the terminal 110 and information about the zone. According to another exemplary embodiment of the present invention, the communication unit 220 may directly receive first information of the terminal 110 from the terminal 110. Information about a time in which the terminal 110 has previously stayed in the zone may include a time in which the terminal 110 has entered in the zone and has left from the zone. The controller 240 may periodically determine whether a wireless signal in which the communication unit 220 receives from the terminal 110 exists to determine an entering time and leaving time of the terminal 110.

The storage unit 230 may register an occupant's activity pattern based on a signal received by the communication unit 220. For example, the storage unit 230 may generate and store a tracking table on each occupant (terminal) basis. According to an exemplary embodiment of the present invention, the storage unit 230 may store first information and/or second information of the terminal 110. According to an exemplary embodiment of the present invention, second information of the terminal 110 may include an expected staying time and/or an expected leaving time of the terminal 110.

The controller 240 may determine second information of the terminal 110 including an expected leaving time of the terminal 110 based on first information of the terminal 110. For example, the controller 240 may calculate an expected staying time of the terminal 110 based on first information of the terminal 110 and calculate an expected leaving time of the terminal 110 based on a latest entering time and the expected staying time of the terminal 110. First information of the terminal 110 may include the count in which the terminal 110 has stayed in the zone. Only when the count is equal to or greater than a first reference value, the controller 240 may calculate the expected staying time. If the count is 2 or more, the controller 240 may calculate the expected leaving time of the terminal 110 based on an average value of times in which the terminal 110 has previously stayed in the zone. The controller 240 may determine an operation mode and operation time of the air conditioner 130 based on the second information of the terminal 110.

The controller 240 may determine an occupying rate of the terminal 110 in which an expected staying time is calculated among the terminals 110 staying in a zone. If the occupying rate is smaller than a second reference value or if a carbon dioxide density measured by the detection unit 210 is smaller than a third reference value, the controller 240 may determine an operation mode and operation time of the air conditioner 130 based on the carbon dioxide density. If the occupying rate is equal to or greater than a second reference value and if the carbon dioxide density is equal to or greater than a third reference value, the controller 240 may determine an operation mode and operation time of the air conditioner 130 based on an exceeded stay time. In this case, if the terminal 110 in which an operation mode and operation time corresponding to the terminal are determined is 2 or more, the controller 240 may determine an operation mode having a highest occupying rate among operation modes corresponding to each terminal 110 in which an operation mode and operation time corresponding to the terminal are determined to an operation mode of the air conditioner 130 and determine a minimum value of operation times corresponding to an operation mode determined to an operation mode of the air conditioner 130 to an operation time of the air conditioner 130.

Figure 3:
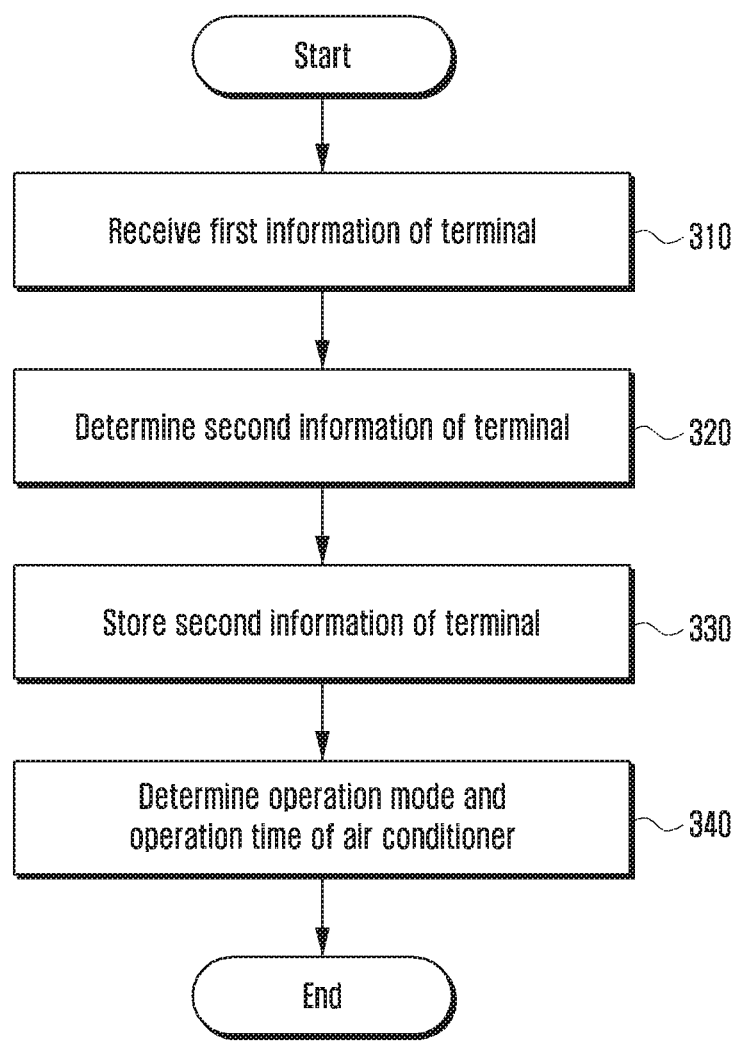
FIG. 3 is a flowchart illustrating operation of determining a method of operating an air conditioner.

FIG. 3 is a flowchart illustrating operation of determining a method of operating an air conditioner according to an exemplary embodiment of the present invention.

The air conditioner 130 receives first information of the terminal 110 including information about a time in which the terminal 110 has previously stayed in a zone at step 310. First information of the terminal 110 may be directly received from the terminal 110 or may be received through the wireless AP 120.

The air conditioner 130 may determine second information of the terminal 110 including an expected leaving time of the terminal 110 based on first information of the terminal 110 staying in the zone at step 320. For example, the air conditioner 130 may calculate an expected staying time of the terminal 110 based on first information of the terminal 110 and may calculate an expected leaving time of the terminal 110 based on a latest entering time and the expected staying time of the terminal 110. Information about a time in which the terminal 110 has previously stayed in the zone may include an entering time and leaving time of the terminal 110. The entering time and leaving time of the terminal 110 may be determined according to whether a wireless signal received from the terminal 110 exists. Operation of determining second information of the terminal 110 will be described in detail with reference to FIG. 4. The air conditioner 130 may store the second information of the terminal 110 at step 330.

The air conditioner 130 may determine an operation mode and operation time of the air conditioner 130 based on the second information of the terminal 110 at step 340. Operation of determining an operation mode and operation time of the air conditioner 130 will be described in detail with reference to FIG. 5.

According to another exemplary embodiment of the present invention, the wireless AP 120 may perform steps 310, 320, and 330.

Figure 4:
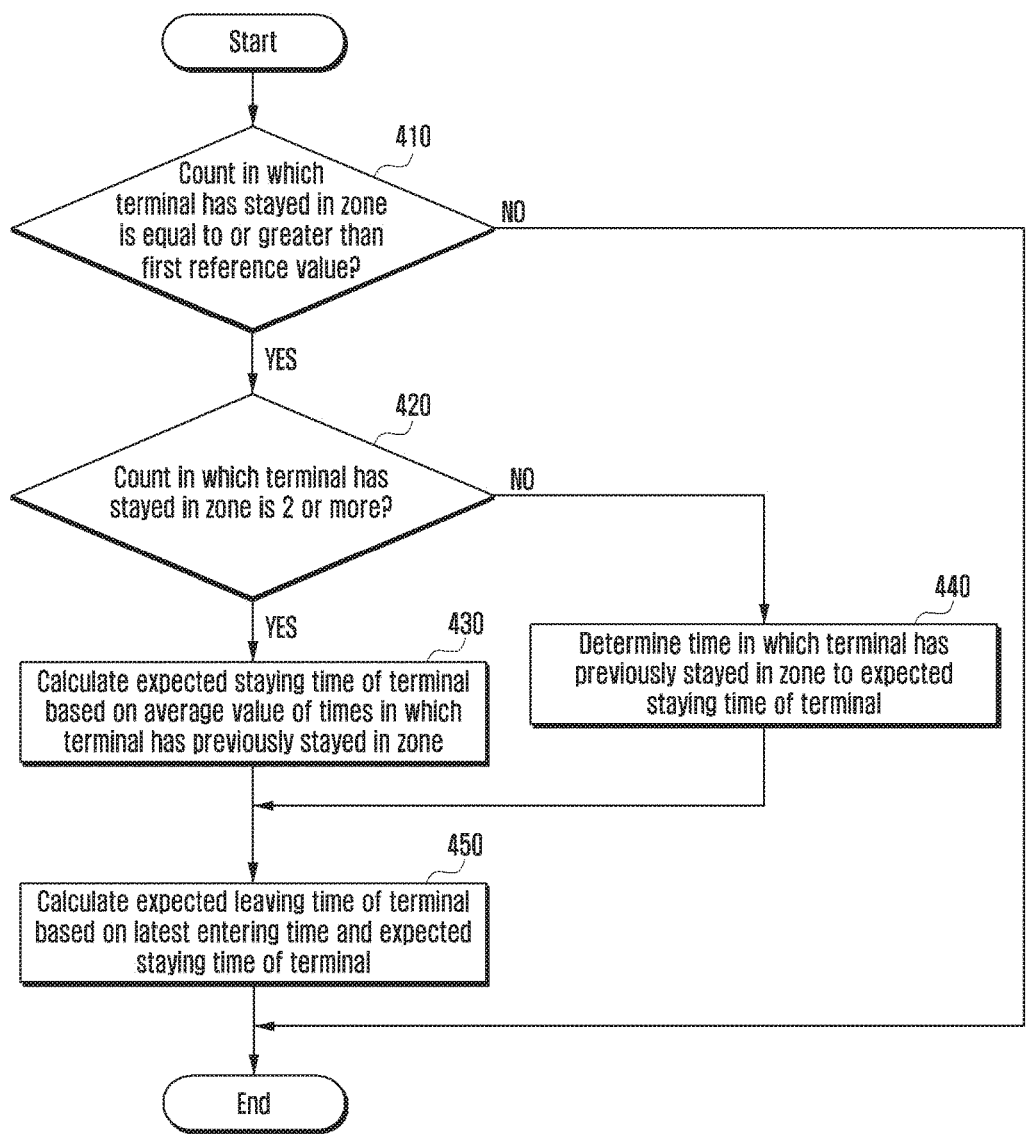
FIG. 4 is a flowchart illustrating operation of determining an expected leaving time of a terminal.

FIG. 4 is a flowchart illustrating operation of determining an expected leaving time of a terminal according to an exemplary embodiment of the present invention.

First information of the terminal 110 may include the count in which the terminal has stayed in a zone. The air conditioner 130 may determine whether the count is equal to or greater than a first reference value at step 410. The first reference value may be a predetermined positive integer. If the count is smaller than a first reference value, the air conditioner 130 may not determine second information of the terminal 110. For example, if the first reference value is 4, the air conditioner 130 may not determine second information of the terminal 110 in which the count in which the terminal has stayed in the zone is 3 or less. If the count is equal to or greater than a first reference value, the air conditioner 130 may determine whether the count is 2 or more at step 420. If the count is 2 or more, the air conditioner 130 may calculate an expected staying time of the terminal 110 based on an average value of times in which the terminal 110 has previously stayed in the zone at step 430. If the count is smaller than 2, the air conditioner 130 may determine a time in which the terminal 110 has previously stayed in the zone to an expected staying time of the terminal 110 at step 440. The air conditioner 130 may calculate an expected leaving time of the terminal 110 based on a latest entering time and the expected staying time of the terminal 110 at step 450.

Figure 5:
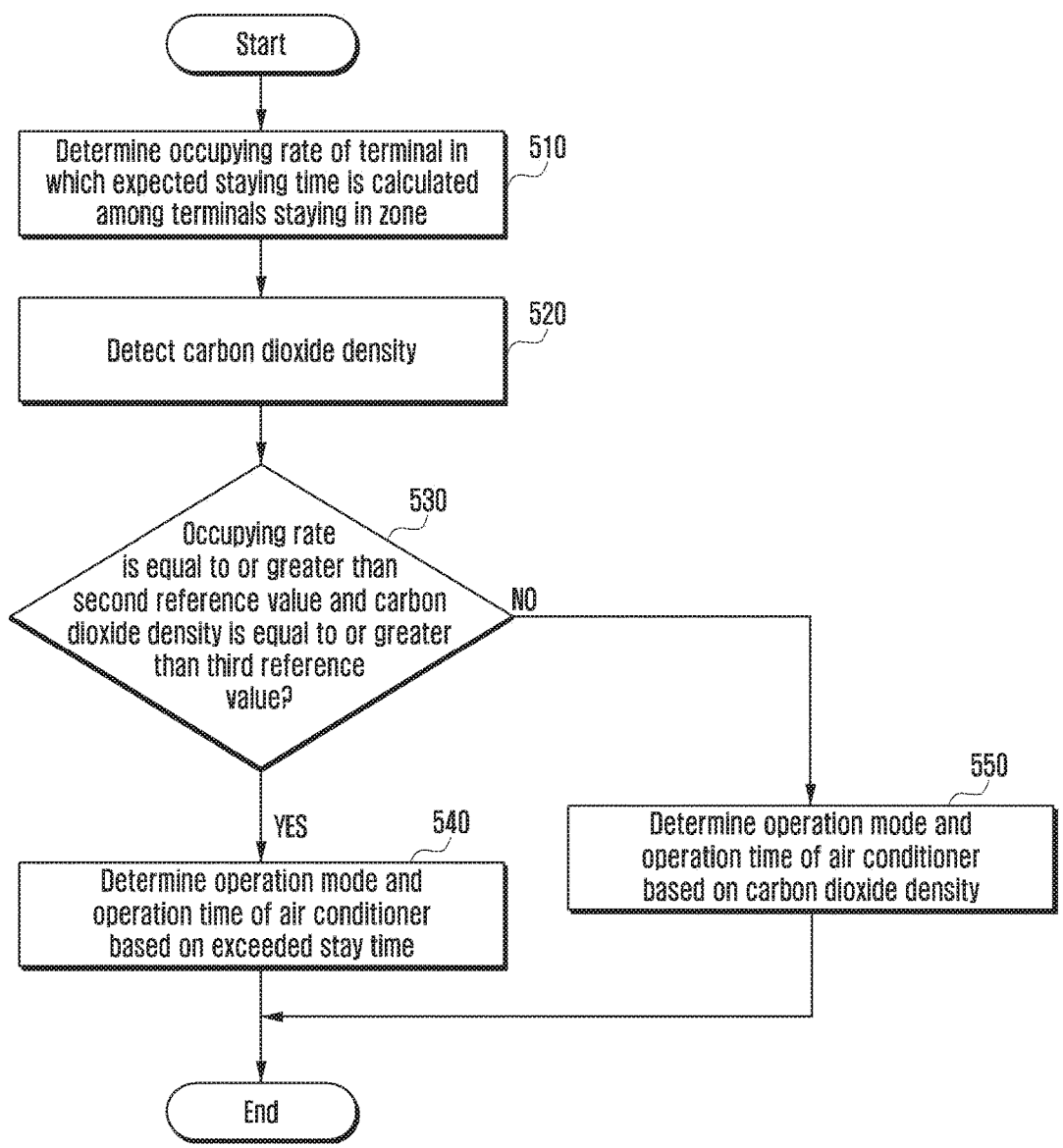
FIG. 5 is a flowchart illustrating operation of determining an operation mode and operation time of an air conditioner.

FIG. 5 is a flowchart illustrating operation of determining an operation mode and operation time of an air conditioner according to an exemplary embodiment of the present invention.

The air conditioner 130 determines an occupying rate of the terminal 110 in which an expected staying time is calculated among terminals staying in a zone at step 510. The air conditioner 130 detects a carbon dioxide density of the zone at step 520. The detection may be periodically performed or may be performed when a predetermined event occurs. The predetermined event may be, for example a case in which a change occurs in the number of terminals staying in the zone.

The air conditioner 130 may determine whether the occupying rate is equal to or greater than a second reference value and whether a carbon dioxide density is equal to or greater than a third reference value at step 530. If the occupying rate is equal to or greater than a second reference value and if a carbon dioxide density is equal to or greater than a third reference value, the air conditioner 130 may determine an operation mode and operation time of the air conditioner 130 based on an exceeded stay time at step 540. Operation of determining an operation mode and operation time of the air conditioner 130 based on an exceeded stay time will be described in detail with reference to FIG. 6.

If the occupying rate is smaller than a second reference value or if a carbon dioxide density is smaller than a third reference value, the air conditioner 130 may determine an operation mode and operation time of the air conditioner 130 based on the carbon dioxide density at step 550. For example, if the occupying rate is smaller than 70% or if the carbon dioxide density is smaller than 800 ppm, the air conditioner 130 may determine a first mode to an operation mode for subsequent 5 minutes of the air conditioner 130.

Figure 6:
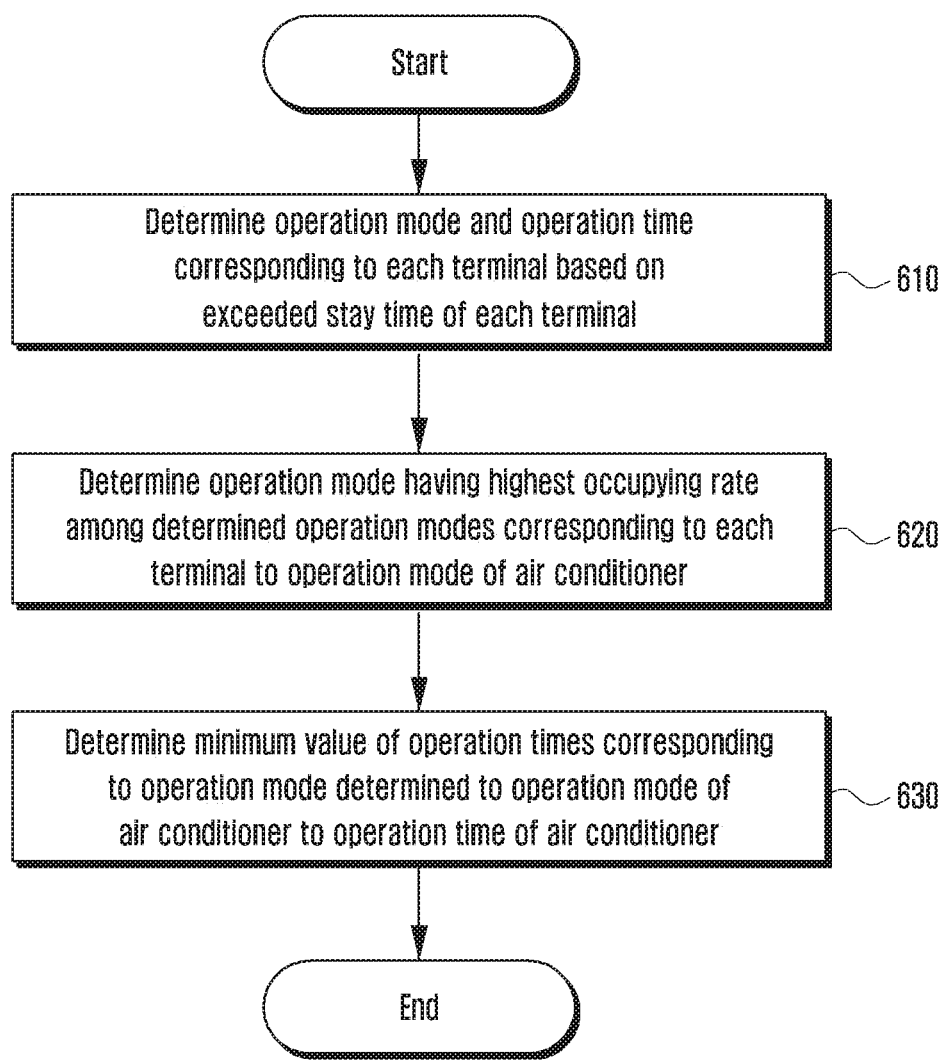
FIG. 6 is a flowchart illustrating operation of determining a final operation mode and final operation time of an air conditioner based on an operation mode and operation time corresponding to each terminal.

FIG. 6 is a flowchart illustrating operation of determining a final operation mode and final operation time of an air conditioner based on an operation mode and operation time of each terminal according to an exemplary embodiment of the present invention.

The air conditioner 130 may determine an operation mode and operation time corresponding to each terminal 110 based on an exceeded stay time of the each terminal 110 at step 610. The air conditioner 130 may determine an operation mode having a highest occupying rate among the determined operation modes corresponding to the each terminal 110 to an operation mode of the air conditioner 130 at step 620. The air conditioner 130 may determine a minimum value of operation times corresponding to an operation mode determined to an operation mode of the air conditioner 130 to an operation time of the air conditioner 130 at step 630. Operations of FIG. 6 will be again described with reference to FIG. 9.

Hereinafter, operation of determining an operation mode and operation time of the air conditioner based on an activity pattern of an occupant will be again described in detail.

Each terminal may transmit a signal including terminal ID through short range communication. The ID may include a Media Access Control (MAC) address of a wireless Local Area Network (LAN) corresponding to the terminal. The transmission may be periodically performed, and a transmission cycle may be, for example 1 minute. The wireless AP may receive a signal from a terminal existing within an effective communication distance. The wireless AP may transmit a received time of a signal, ID included in the received signal, and information about a zone managed by the wireless AP to the air conditioner. The air conditioner may generate a first tracking table of Table 1 based on information included in the signal received from the wireless AP.

TABLE 1

| ID | Date information | Entering time $T_{Enter}$ | Leaving time $T_{Leaving}$ | Zone |
|---|---|---|---|---|
| #1 | 2013/09/16 (Mon) | 11:30 | 12:00 | Restaurant |
| #1 | 2013/09/23 (Mon) | 11:24 | 12:05 | Restaurant |

Terminal ID may include an identifier of a terminal. ID may include, for example, a MAC address of a wireless LAN corresponding to the terminal. Date information represents information related to a date in which a wireless AP received a signal from the terminal. The entering time may represent a time in which the terminal starts to locate within an effective communication distance of the wireless AP. The entering time may be a time in which the wireless AP starts to periodically receive a signal from the terminal. The leaving time may be a time in which the terminal starts to locate at the outside of an effective communication distance of the wireless AP. The leaving time may be a time in which the wireless AP terminates to periodically receive a signal from the terminal. The zone represents an area in which each wireless AP manages. At least two wireless APs may manage each zone.

Table 1 shows that a terminal whose ID is #1 entered at a restaurant at 11:30 of Sep. 16, 2013 and left from the restaurant at 12:00. Further, Table 1 shows that a terminal whose ID is #1 entered at a restaurant at 11:24 of Sep. 23, 2013 and left from the restaurant at 12:05.

Table 1 represents that a tracking table is generated based on a signal received from a wireless AP, having received a signal from a terminal and the present invention is not limited thereto. For example, the communication unit 220 of the air conditioner may directly receive a signal from a terminal to generate a tracking table.

Table 2 represents an illustration of a second tracking table generated for a plurality of terminals.

TABLE 2

| ID | Time classification | Expected entering time $T_{Enter}$ | Expected leaving time $T_{Leaving}$ | Zone | Expected staying time $T_{Expect}$ | Count |
|---|---|---|---|---|---|---|
| #1 | Mon | 11:27 | 12:02 | Restaurant | 35 minutes | 2 |
| #2 | Wed | 13:00 | 14:00 | Lounge | 60 minutes | 5 |
| #3 | Fri | 10:00 | 10:45 | Conference room | 45 minutes | 10 |
| ...... | ... | ... | ... | ... | ... | ... |
| ...... | ... | ... | ... | ... | ... | ... |

The air conditioner, having generated a first tracking table for a plurality of terminals may generate a second tracking table of Table 2 using the first tracking table. ID may include an identifier of the terminal. ID may include, for example, a MAC address of a wireless LAN corresponding to the terminal. Time classification may represent a time property according to a predetermined reference. Table 2 represents day of the week as a reference at time classification, but the present invention is not limited thereto. According to another exemplary embodiment of the present invention, at least two days of the week may be classified into the same item, and for example, time classification may be classified into weekday and holiday. According to another exemplary embodiment of the present invention, time classification may be classified on a time slot basis or a time slot and day of the week may be combined and classified, and for example, time classification may be classified into AM of Mon and PM of Mon. The expected entering time and the expected leaving time are calculated using the entering time and leaving time of Table 1. For example, each average value of an entering time and leaving time of the same time slot of the same day of the week may be calculated, and the calculated average value may be determined to an expected entering time and expected leaving time. The zone may represent at least one zone in which the air conditioner manages. At least one zone may be managed on a wireless AP basis. The expected staying time represents a time difference between an expected entering time and an expected leaving time. For example, when the expected entering time is 11:27 and the expected leaving time is 12:02, the expected staying time may be 35 minutes corresponding to a time difference between these times. The count (frequency) represents the count in which the terminal has stayed in a corresponding zone. Specifically, the count represents the count in which each terminal enters at each zone and leaves from each zone at a time corresponding to specific time classification. For example, in Table 1, because the count in which a terminal whose ID is #1 has entered at a restaurant and has left from the restaurant is two, the count becomes 2.

First information of a terminal staying in a zone may include information about a time in which the terminal has previously stayed in the zone. First information of a terminal may include, for example, information included in a first tracking table of Table 1 or a second tracking table of Table 2. In the example, the air conditioner generates and stores the entire of a first tracking table of Table 1 and a second tracking table of Table 2, but the present invention is not limited thereto. For example, for at least one terminal existing within an effective communication distance, when each wireless AP may generate a first tracking table and periodically report information about the generated first tracking table to the air conditioner, the air conditioner may generate a second tracking table based on received information.

Figure 7:
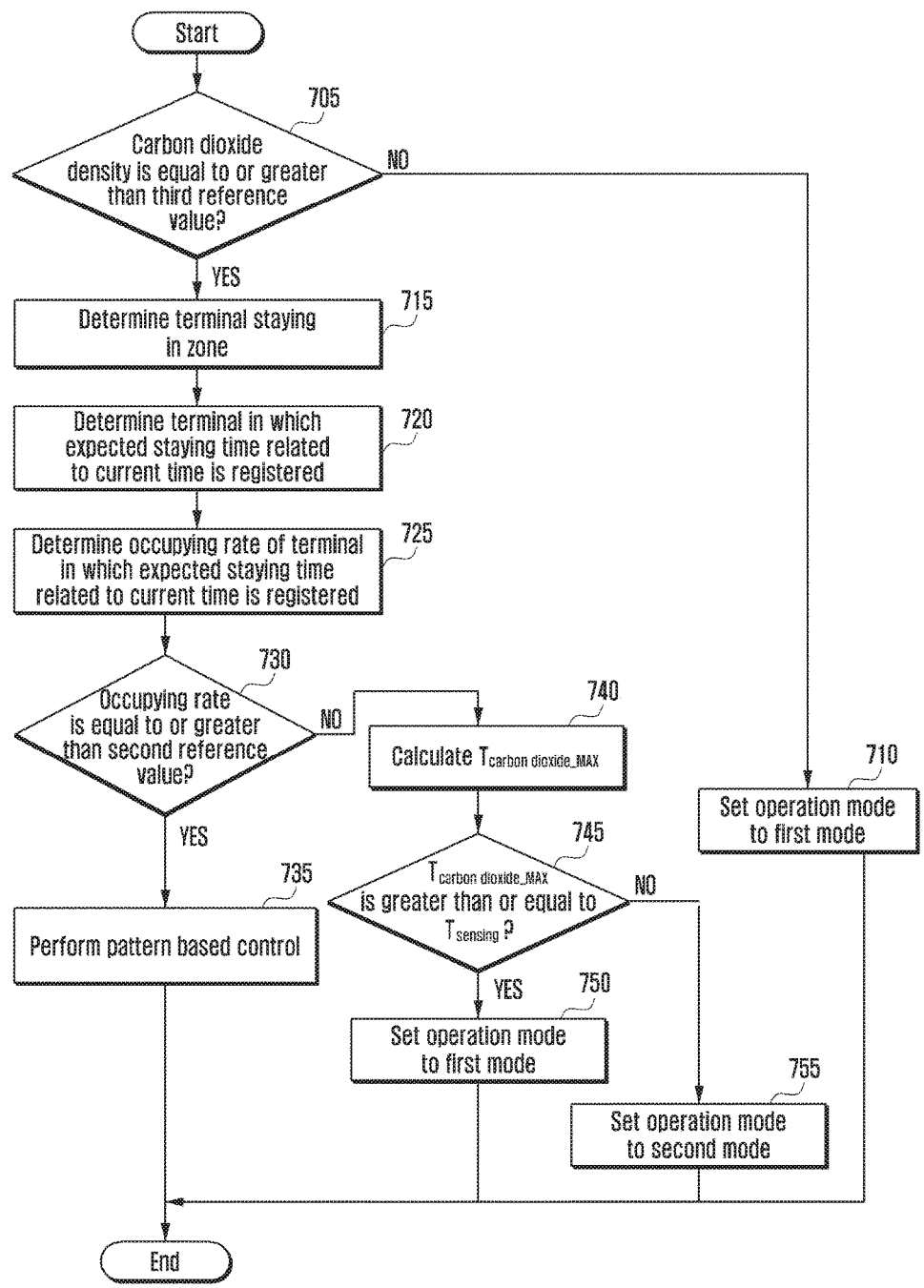
FIG. 7 is a flowchart illustrating operation of determining whether to apply a pattern based control.

FIG. 7 is a flowchart illustrating operation of determining whether to apply a pattern based control according to an exemplary embodiment of the present invention.

An application reference of a pattern based control may be differently set on a zone basis and may be used for determining whether to apply a pattern based control on each zone basis. FIG. 7 illustrates operating of determining whether a control is to apply based on a user pattern to each terminal in one zone.

The air conditioner determines whether a current carbon dioxide density is equal to or greater than a third reference value at step 705. A third reference value may be, for example, 800 ppm or 1000 ppm and is not limited thereto.

If a current carbon dioxide density is smaller than a third reference value, the process continues at step 710. According to an exemplary embodiment of the present invention, if a current carbon dioxide density is smaller than a third reference value, a pattern based control is not applied, and the air conditioner may be set to operate in a first mode at step 710.

As described above, in this specification and claims, for convenience, it is assumed that a power consumption amount or a fan velocity of a first mode is smaller than that of a second mode. In the following description, a first mode is referred to as a slow mode and a second mode is referred to as a turbo mode. In this specification and claims, two operation modes are described, but three or more operation modes may be implemented.

If a current carbon dioxide density is equal to or greater than a third reference value, the process continues at step 715. The air conditioner determines a terminal staying in a current corresponding zone at step 715. Determination of a terminal staying in a corresponding zone may be performed by recognizing a terminal that transmits a wireless signal.

The air conditioner determines a terminal in which an expected staying time related to a current time is registered among the recognized terminals at step 720. For example, the air conditioner may determine a terminal in which a current time is located between an expected entering time and an expected leaving time or in which a current time is located about an expected entering time or an expected leaving time. When a current time is 12:00, in Table 2, an expected staying time of a terminal whose ID is #1 is 35 minutes (11:27-12:02), and the terminal whose ID is #1 may be determined to a terminal in which an expected staying time related to a current time is registered.

The air conditioner determines an occupying rate of a terminal in which an expected staying time related to a current time is registered among entire terminals staying in a zone at step 725. For example, the air conditioner determines that total 9 terminals stay at a restaurant, and when the number of terminals in which an expected staying time is registered at a current day of the week and the same time slot is 5 among the total 9 terminals, the occupying rate becomes 5/9=about 55.55%.

The air conditioner determines whether the determined occupying rate is equal to or greater than a second reference value at step 730. A second reference value may be, for example 70%.

If the determined occupying rate is equal to or greater than a second reference value, the process continues at step 735. The air conditioner performs a pattern based control at step 735. The pattern based control will be described in detail with reference to FIGS. 8 and 9.

If the occupying rate is less than a second reference value, the process continues at step 740. The air conditioner calculates a time $T_{carbon\ dioxide\_MAX}$ to be taken when carbon dioxide of a corresponding zone arrives at a maximum allowable carbon dioxide density based on the number $N_{Total}$ of an entire terminal (total occupant) staying in the zone and a current carbon dioxide amount at step 740. This may be represented with the following equation.

$$T_{carbon\ dioxide\_MAX} = \frac{C_{carbon\ dioxide\_MAX} - C_{carbon\ dioxide\_current}}{C_{carbon\ dioxide\_person} SN_{Total}}$$

where $C_{carbon\ dioxide\_MAX}$: maximum allowable carbon dioxide amount,
$C_{carbon\ dioxide\_current}$: current carbon dioxide amount, and
$C_{carbon\ dioxide\_person}$: carbon dioxide amount in which a person generates for 1 minute.

The air conditioner may compare a magnitude of $T_{carbon\ dioxide\_MAX}$ magnitude of a current carbon dioxide sensing cycle $T_{sensing}$ at step 745. $T_{sensing}$ may be a predetermined value and may be, for example 3 minutes.

If $T_{carbon\ dioxide\_MAX}$ is greater than or equal to $T_{sensing}$, the process continues at step 750. The air conditioner sets an operation mode to a first mode at step 750. According to an exemplary embodiment of the present invention, the air conditioner may operate for a time of $T_{sensing}$ in the first mode.

If $T_{carbon\ dioxide\_MAX}$ is smaller than $T_{sensing}$, the process continues at step 755. The air conditioner sets an operation mode to a second mode at step 755. According to an exemplary embodiment of the present invention, the air conditioner may operate for a time of $T_{carbon\ dioxide\_MAX}$ in the second mode.

Figure 8:
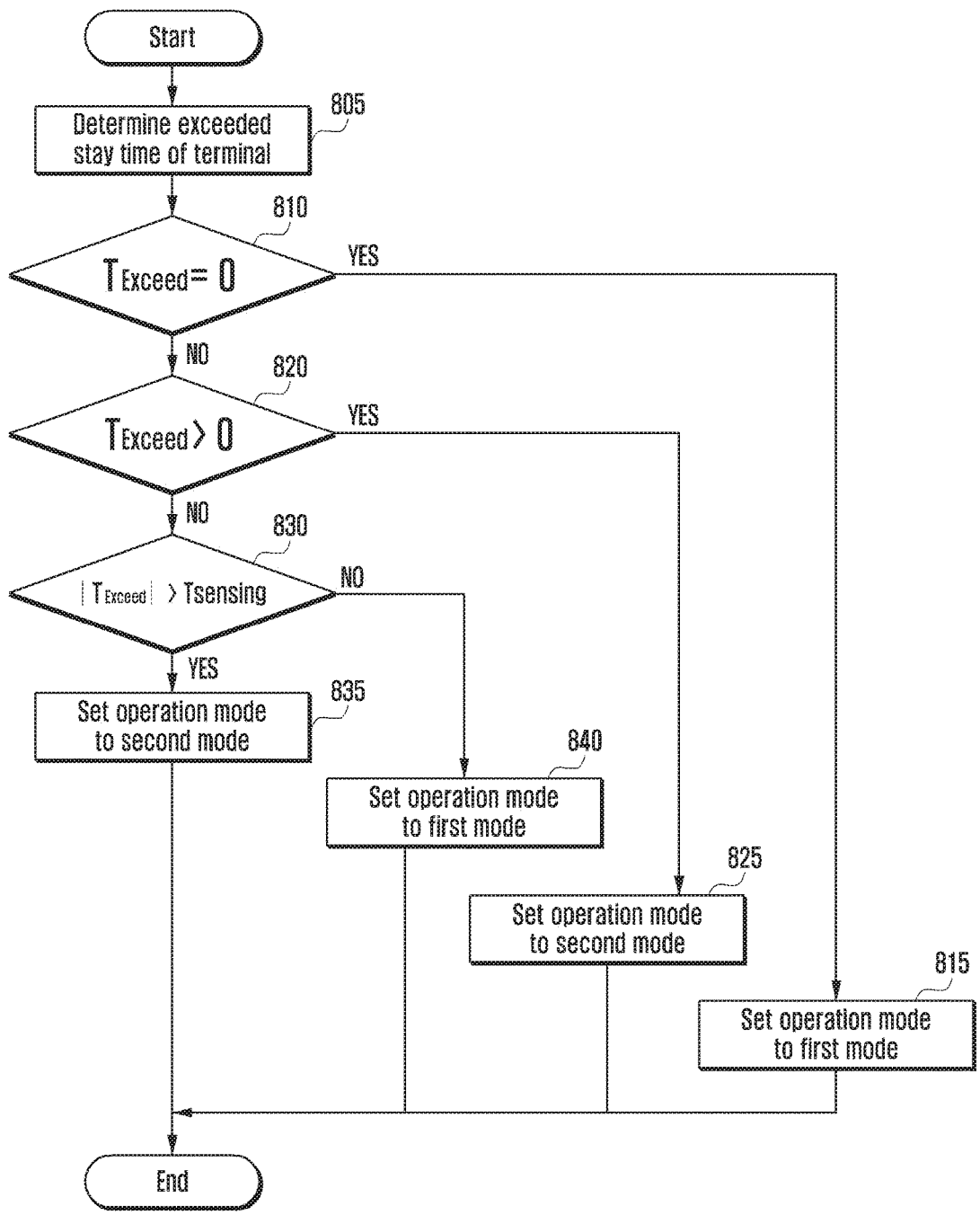
FIG. 8 is a flowchart illustrating operation of determining an operation mode and operation time corresponding to each terminal in one zone.

FIG. 8 is a flowchart illustrating operation of determining an operation mode and operation time corresponding to each terminal in one zone according to an exemplary embodiment of the present invention.

The air conditioner derives an exceeded stay time of an occupant (terminal) in a corresponding zone at step 805. The exceeded stay time $T_{Exceed}$ may be obtained by the following equation.

$$T_{Exceed} = (T_{Current} - T_{Join}) - T_{Expect}$$

where $T_{Current}$: current time,
$T_{Join}$: entering time of corresponding terminal, and
$T_{Expect}$: expected staying time of corresponding terminal.

As can be seen in the equation, the exceeded stay time $T_{Exceed}$ represents a time difference between an estimated time at which an occupant in a corresponding zone is to leave and a current time. When the exceeded stay time $T_{Exceed}$ is 0, a current time represents an estimated time at which an occupant is to leave. When an exceeded stay time $T_{Exceed}$ is the positive number, it represents that an estimated time at which an occupant is to leave has already elapsed. When an exceeded stay time $T_{Exceed}$ is the negative number, it represents that an estimated time at which an occupant is to leave does not yet arrive.

The air conditioner determines whether an exceeded stay time $T_{Exceed}$ is 0 at step 810.

If an exceeded stay time $T_{Exceed}$ is 0, the process continues at step 815. The air conditioner sets an operation mode to a first mode at step 815. According to an exemplary embodiment of the present invention, the air conditioner may operate for a time of $T_{sensing}$ in the first mode.

If an exceeded stay time $T_{Exceed}$ is not 0, the process continues at step 820. The air conditioner determines whether the exceeded stay time $T_{Exceed}$ is the positive number at step 820.

If the exceeded stay time $T_{Exceed}$ is the positive number, the process continues at step 825. The air conditioner sets an operation mode to a second mode at step 820. According to an exemplary embodiment of the present invention, the air conditioner may operate for a time of $T_{sensing}$ in a second mode.

If the exceeded stay time $T_{Exceed}$ is the negative number, the process continues at step 830. The air conditioner compares a magnitude of $T_{Exceed}$ and a magnitude of $T_{sensing}$ at step 830.

If a magnitude of $T_{Exceed}$ is greater than or equal to a magnitude of $T_{sensing}$, the process continues at step 835. The air conditioner sets an operation mode to a second mode at step 835. According to an exemplary embodiment of the present invention, the air conditioner may operate for a time of $T_{sensing}$ in the second mode.

If a magnitude of $T_{Exceed}$ is smaller than that of $T_{sensing}$, the process continues at step 840. The air conditioner sets an operation mode to a first mode at step 840. According to an exemplary embodiment of the present invention, the air conditioner may operate for a time corresponding to a magnitude of $T_{Exceed}$ in the first mode.

Table 3 represents an exceeded stay time $T_{Exceed}$, a preset operation mode, and an operation time $T_{Operation}$ when a current time $T_{Current}$, an entering time $T_{Join}$, and an expected staying time $T_{Expect}$ are provided according to the present exemplary embodiment.

TABLE 3

| $T_{Current}$ | $T_{Join}$ | $T_{Expect}$ | $T_{Exceed}$ | Operation mode | $T_{Operation}$ |
|---|---|---|---|---|---|
| 11:40 | 11:30 | 30 minutes | −20 minutes | turbo | 15 |
| 11:45 | 11:30 | 30 minutes | −15 minutes | turbo | 15 |
| 11:50 | 11:30 | 30 minutes | −10 minutes | slow | 10 |
| 11:55 | 11:30 | 30 minutes | −5 minutes | slow | 5 |
| 11:56 | 11:30 | 30 minutes | −4 minutes | slow | 4 |
| 11:58 | 11:30 | 30 minutes | −2 minutes | slow | 2 |
| 12:00 | 11:30 | 30 minutes | 0 minute | slow | 15 |
| 12:03 | 11:30 | 30 minutes | 3 minutes | turbo | 15 |

In the foregoing exemplary embodiment, if $T_{Exceed}$ is the positive number, it was determined that there is a high probability that an occupant continuously stays in a corresponding zone, if $T_{Exceed}$ is 0, it was determined that there is a low probability that an occupant continuously stays in a corresponding zone, and if $T_{Exceed}$ is the positive number, a probability that an occupant continuously stays in a corresponding zone based on a remaining time to an expected leaving time was determined. In FIG. 8, a range of $T_{Exceed}$ is divided into three, but is not limited thereto. For example, in FIG. 8, operation of a case of $0 < T_{Exceed} < 5$ min may be the same as that of a case of $T_{Exceed} = 0$.

Figure 9:
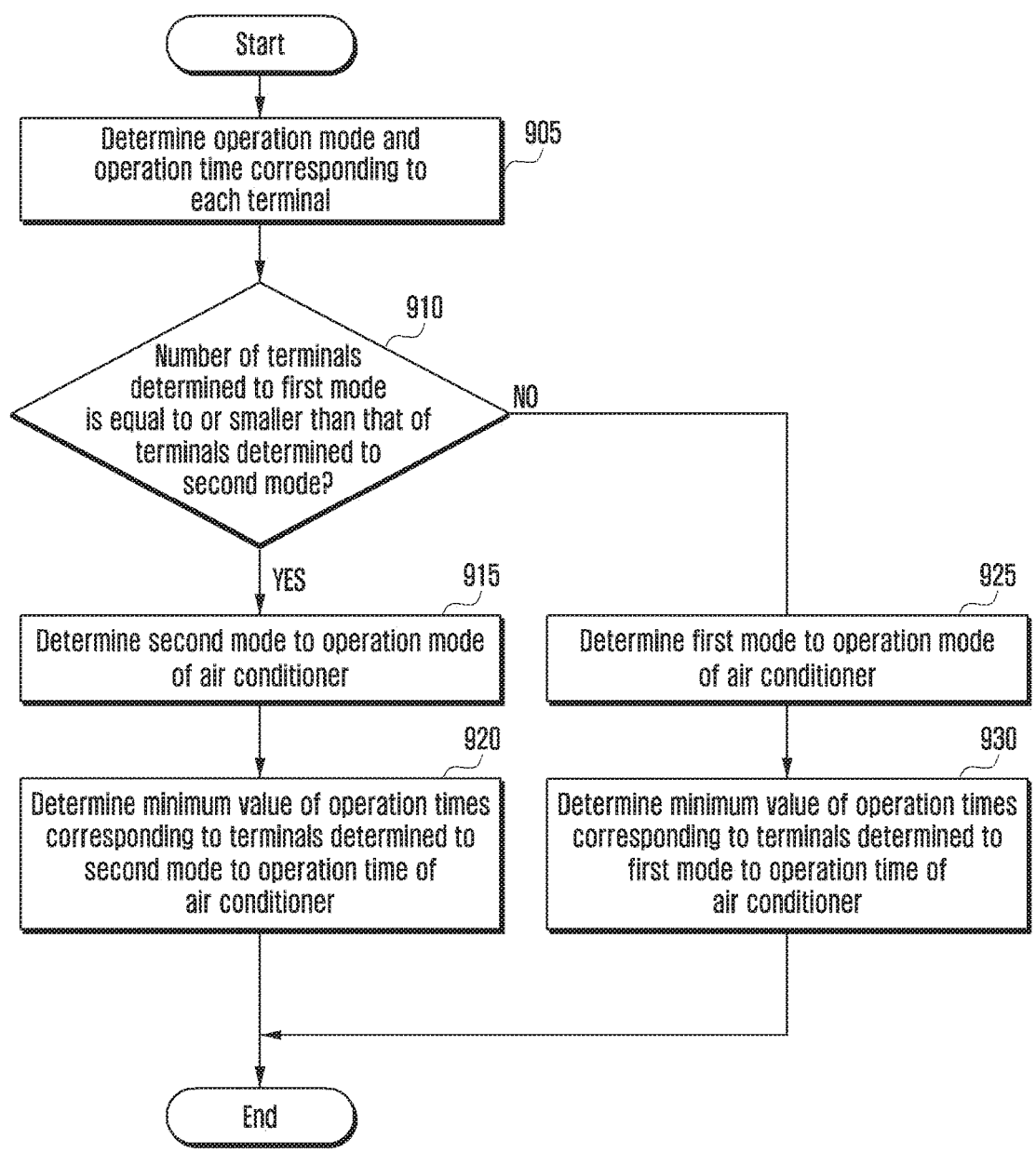
FIG. 9 is a flowchart illustrating operation of determining a final operation mode and final operation time of an air conditioner in one zone.

FIG. 9 is a flowchart illustrating operation of determining a final operation mode and final operation time of an air conditioner in one zone according to an exemplary embodiment of the present invention.

When an occupant is a person, an exceeded stay time $T_{Exceed}$ is calculated, and a final operation mode and final operation time may be determined based on the exceeded stay time $T_{Exceed}$, as shown in FIG. 8. When an occupant (terminal) in one zone is two persons, an operation mode and operation time corresponding to each terminal may be different and thus it is necessary to unify an operation mode and operation time of a corresponding zone, and in FIG. 9, an exemplary embodiment of operation of unifying an operation mode and operation time is illustrated.

An operation mode and operation time corresponding to each terminal located in one zone are determined at step 905. The operation mode and operation time may be determined by operation of FIG. 8.

The air conditioner compares the number of occupants (terminals) in an operation mode determined to a slow mode (first mode) and the number of occupants (terminals) in an operation mode determined to a turbo mode (second mode) at step 910.

If the number of occupants in which an operation mode is a turbo mode is greater than or equal to that of occupants in which an operation mode is a slow mode, the process continues at step 915. The air conditioner may set an operation mode of a corresponding zone to a turbo mode at step 915 and may set an operation time of a preset turbo mode to an operation time of an occupant having a shortest operation time among occupants in which an operation mode is a turbo mode at step 920. The process will be described through Table 4.

Table 4 illustrates an operation mode and operation time determined for each terminal. A symbol "#1" represents each ID, but this is a symbol for convenience and is not limited thereto.

TABLE 4

| ID | Mode | Operation time |
|---|---|---|
| #1 | turbo | 5 minutes |
| #2 | slow | 5 minutes |
| #3 | turbo | 15 minutes |
| #4 | turbo | 3 minutes |
| #5 | turbo | 8 minutes |
| #6 | slow | 2 minutes |
| #7 | turbo | 7 minutes |

In Table 4, the number of occupants in which an operation mode is a turbo mode is 5 persons, and the number of occupants in which an operation mode is a slow mode is 2 persons. Therefore, the number of occupants in which an operation mode is a turbo mode is greater than that of occupants in which an operation mode is a slow mode. Among occupants in which an operation mode is a turbo mode, ID of a terminal of occupants having a shortest operation time is #4. According to an exemplary embodiment of the present invention, because the number of occupants in which an operation mode is a turbo mode is largest, an operation mode of a corresponding zone is set to a turbo mode, and among occupants in which an operation mode is a turbo mode, an operation time of a terminal #4 having a shortest operation time is set to 3 minutes.

If the number of occupants in which an operation mode is a turbo mode is smaller than that of occupants in which an operation mode is a slow mode, the process continues at step 925. The air conditioner may set an operation mode of a corresponding zone to a slow mode (first mode) and set an operation time of a preset slow mode to an operation time of an occupant having a shortest operation time among occupants in which an operation mode is a slow mode at step 925.

As shown in FIG. 9, if the number of occupants in which an operation mode is a turbo mode is equal to that of occupants in which an operation mode is a slow mode, the process continues at step 915. According to another exemplary embodiment of the present invention, if the number of occupants in which an operation mode is a turbo mode is equal to that of occupants in which an operation mode is a slow mode, an operation mode of a corresponding zone may be implemented into a predetermined mode. The predetermined mode may be a turbo mode, a slow mode, or other mode. Further, a preset mode of operation time may be set to an operation time of an occupant having a shortest operation time among entire occupants.

What is claimed is:

1. A method of operating an air conditioner, the method comprising:
    determining second information of a terminal staying in a zone, the second information including an expected leaving time of the terminal based on first information of the terminal, the first information including information about a length of time in which the terminal had previously stayed in the zone; and
    determining an operation mode and an operation time of the air conditioner based on the second information of the terminal,
    wherein the expected leaving time is determined based on a result of comparing a number of times in which the terminal had previously stayed in the zone and a first reference value.

2. The method of claim 1, wherein the determining of the second information of the terminal comprises:
    determining an expected staying time of the terminal based on the first information of the terminal; and
    determining the expected leaving time of the terminal based on a latest entering time of the terminal and the expected staying time of the terminal.

3. The method of claim 2,
    wherein the first information of the terminal includes a count based on a number of times in which the terminal had previously stayed in the zone, and
    wherein, if the count is equal to or greater than a first reference value, the expected staying time is determined.

4. The method of claim 3, wherein, if the count is 2 or more, the expected leaving time of the terminal is determined based on an average value of times in which the terminal had previously stayed in the zone.

5. The method of claim 3,
    wherein the air conditioner periodically detects a carbon dioxide density of the zone, and
    wherein the determining of the operation mode and the operation time of the air conditioner comprises:
        determining an occupying rate of the terminal in which the expected staying time is determined among terminals staying in the zone; and
        if the occupying rate is smaller than a second reference value or if the carbon dioxide density is smaller than a third reference value, determining the operation mode and the operation time of the air conditioner based on the carbon dioxide density.

6. The method of claim 5, further comprising, if the occupying rate is equal to or greater than a second reference value and if the carbon dioxide density is equal to or greater than a third reference value, determining the operation mode and the operation time of the air conditioner based on an exceeded stay time.

7. The method of claim 6, wherein the determining of the operation mode and the operation time of the air conditioner based on the exceeded stay time comprises:
    determining operation modes and operation times corresponding to each terminal based on the exceeded stay time of each terminal;
    determining a first operation mode having a highest occupying rate among the determined operation modes corresponding to each terminal to the operation mode of the air conditioner; and
    determining a minimum value of the operation times corresponding to the first operation mode of the air conditioner to the operation time of the air conditioner.

8. The method of claim 1, wherein the information about the length of time in which the terminal had previously stayed in the zone includes an entering time and a leaving time of the terminal.

9. The method of claim 8, wherein the entering time and the leaving time of the terminal are determined according to whether a wireless signal that receives from the terminal exists.

10. The method of claim 1, further comprising storing the second information of the terminal.

11. An air conditioner, comprising:
    a transceiver configured to receive first information of a terminal, the first information including information about a length of time in which the terminal had previously stayed in a zone from the terminal staying in the zone; and
    at least one processor configured to:
        determine second information of the terminal, the second information including an expected leaving time of the terminal based on the first information of the terminal, and
        determine an operation mode and an operation time of the air conditioner based on the second information of the terminal,
    wherein the expected leaving time is determined based on a result of comparing a number of times in which the terminal had previously stayed in the zone and a first reference value.

12. The air conditioner of claim 11, wherein the at least one processor is further configured to:
    determine an expected staying time of the terminal based on the first information of the terminal, and
    determine the expected leaving time of the terminal based on a latest entering time and the expected staying time of the terminal.

13. The air conditioner of claim 12,
    wherein the first information of the terminal includes a count based on a number of times in which the terminal had previously stayed in the zone, and
    wherein, if the count is equal to or greater than a first reference value, the at least one processor is further configured to determine the expected staying time.

14. The air conditioner of claim 13, wherein, if the count is 2 or more, the at least one processor is further configured to determine the expected leaving time of the terminal based on an average value of times in which the terminal had previously stayed in the zone.

15. The air conditioner of claim 13, further comprising:
    a detector configured to periodically detect a carbon dioxide density of the zone,
    wherein the at least one processor is further configured to:
        determine an occupying rate of the terminal in which the expected staying time is determined among the terminals staying in the zone, and
        if the occupying rate is smaller than a second reference value or if the carbon dioxide density is smaller than a third reference value, determine the operation mode and the operation time of the air conditioner based on the carbon dioxide density.

16. The air conditioner of claim 15, wherein, if the occupying rate is equal to or greater than the second reference value and if the carbon dioxide density is equal to or greater than the third reference value, the at least one processor is further configured to determine the operation mode and the operation time of the air conditioner based on an exceeded stay time.

17. The air conditioner of claim 16, wherein the at least one processor is further configured to:
determine operation modes and operation times corresponding to each terminal based on the exceeded stay time of each terminal,
determine a first operation mode having a highest occupying rate among the determined operation modes corresponding to each terminal to the operation mode of the air conditioner, and
determine a minimum value of the operation times corresponding to the first operation mode of the air conditioner to the operation time of the air conditioner.

18. The air conditioner of claim 11, wherein the information about the length of time in which the terminal had previously stayed in the zone includes an entering time and a leaving time of the terminal.

19. The air conditioner of claim 18, wherein the at least one processor is further configured to determine the entering time and the leaving time of the terminal according to whether a wireless signal that receives from the terminal exists.

20. The air conditioner of claim 11, further comprising a storage configured to store the second information of the terminal.

* * * * *